June 5, 1945. W. F. BRUMFIELD 2,377,399
VEHICLE
Filed Nov. 25, 1942 3 Sheets-Sheet 1

Inventor
Warren F. Brumfield
By Clarence A. O'Brien
and Harvey B. Jacobson
Attorneys June 5, 1945.   W. F. BRUMFIELD   2,377,399
VEHICLE
Filed Nov. 25, 1942   3 Sheets-Sheet 2
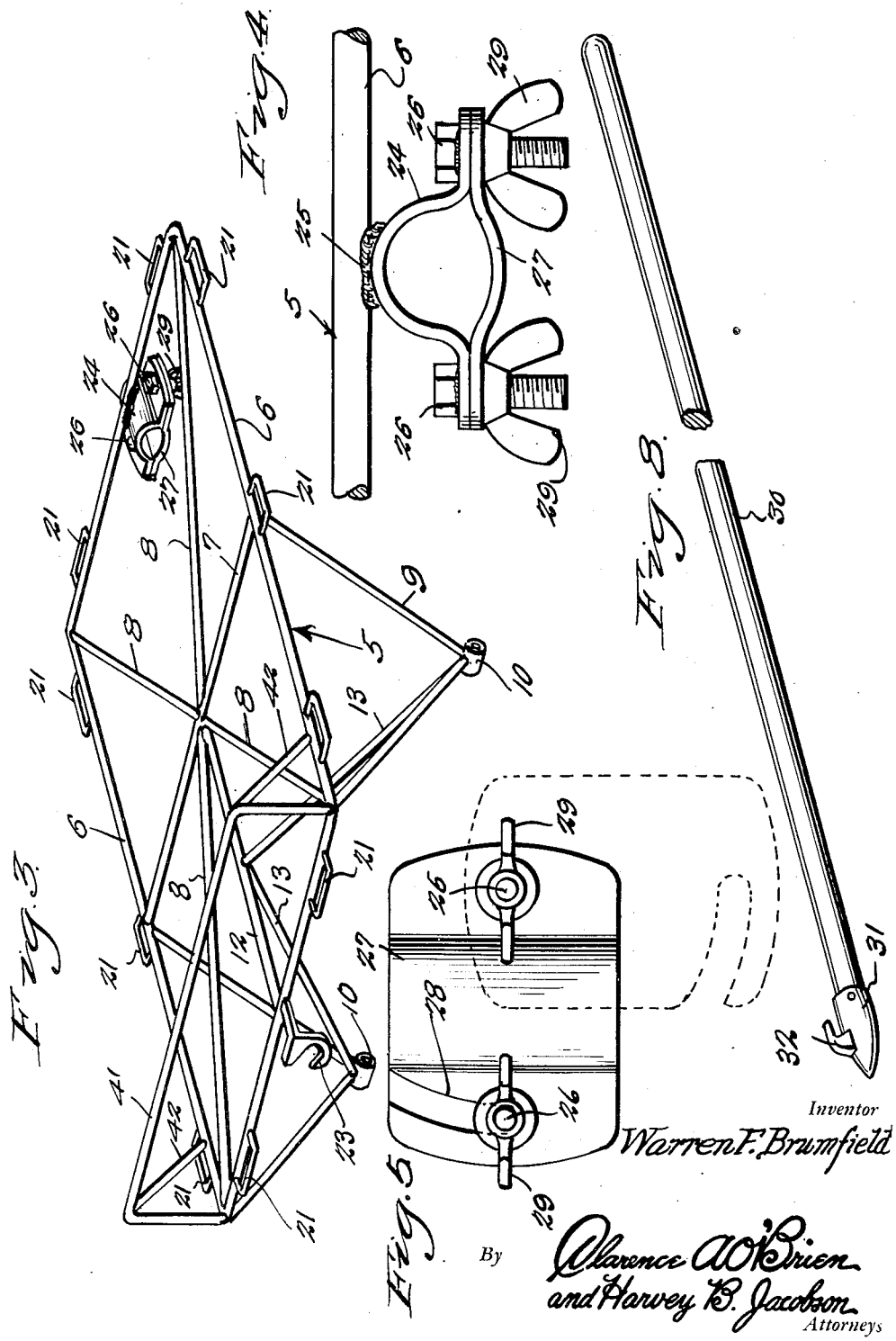

June 5, 1945.                W. F. BRUMFIELD                2,377,399
                                  VEHICLE
                          Filed Nov. 25, 1942            3 Sheets-Sheet 3
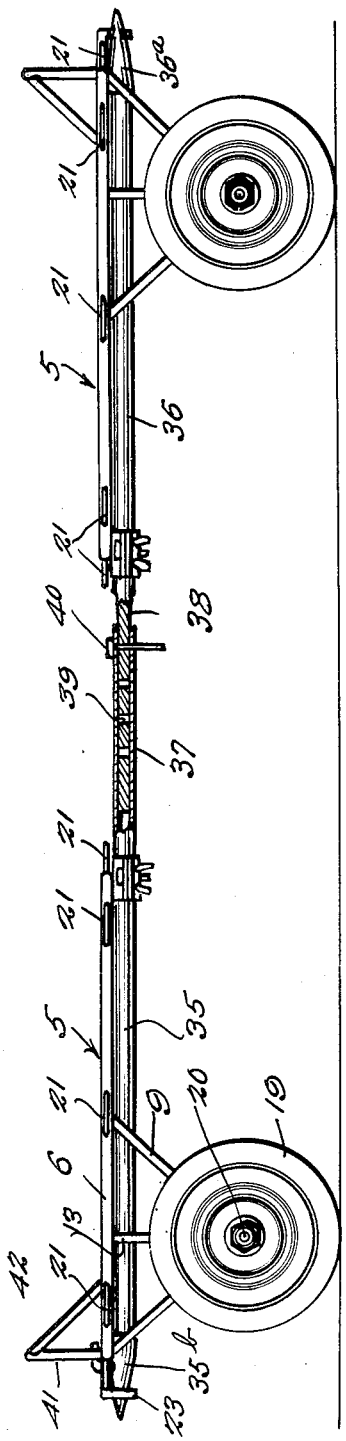
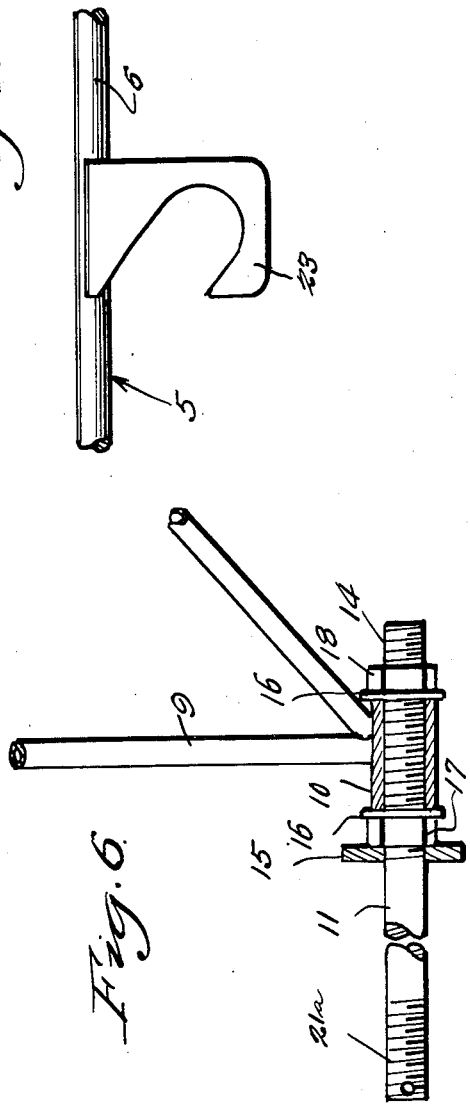
Inventor
Warren F. Brumfield
By Clarence A. O'Brien
and Harvey B. Jacobson
Attorneys Patented June 5, 1945

2,377,399

UNITED STATES PATENT OFFICE 2,377,399

VEHICLE

Warren F. Brumfield, Muskogee, Okla.

Application November 25, 1942, Serial No. 466,874

2 Claims. (Cl. 280—53)

This invention relates to new and useful improvements in vehicles such as are employed for moving baggage, cord wood, camping equipment, fire-fighting equipment in small areas, etc.

An important object of the present invention is to provide a vehicle unit in the form of a two-wheeled cart which can be easily pushed about and which can be combined with another unit of like construction for the purpose of forming a larger vehicle for carrying longer and/or heavier material.

Another important object of the invention is to provide a light weight cart which can be used by Boy Scouts and campers in moving their equipment from stations and other transportation terminals to camp sites.

Other important objects and advantages of the invention will become apparent to the reader of the following description.

In the drawings:

Figure 3 is a perspective view of the chassis of the vehicle.

Figure 4 is an enlarged fragmentary rear end elevational view of the cart showing the staffed clamp.

Figure 5 is a bottom plan view of the clamp.

Figure 6 is a fragmentary detailed sectional view showing one of the wheel mounts.

Figure 7 is a fragmentary front elevational view of the cart chassis showing the staff hook.

Figure 8 is a perspective view of a common type of Boy Scout staff.

Figure 9 is a side elevational view with parts in section showing two of the carts connected together by modified staffs.

Referring to the drawings wherein like numerals designate like parts, it can be seen in Figure 9 that two carts may be connected together to form an elongated vehicle. However, as each cart is of a definite construction, a description of one will suffice for both.

Figure 1:
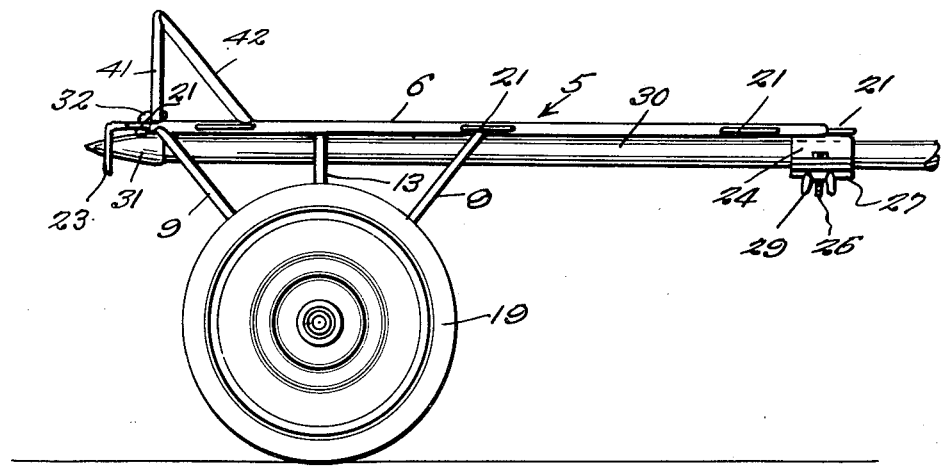
Figure 1 is a side elevational view of the cart.
Figure 2:
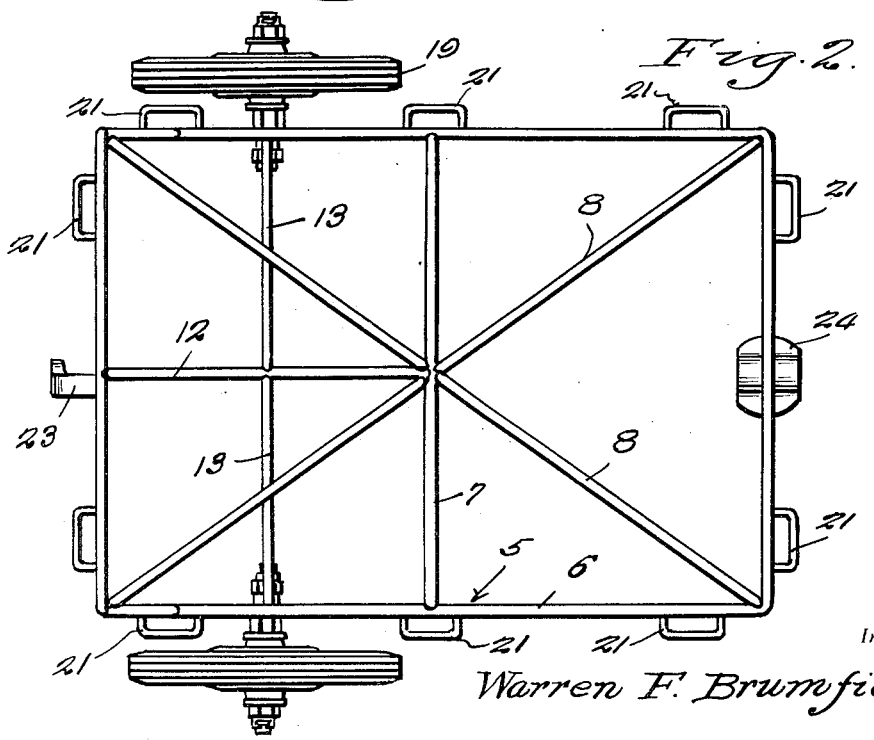
Figure 2 is a top plan view with the staff forming tongue removed.

Referring to Figures 1, 2 and 3, it can be seen that the cart includes a chassis generally referred to by numeral 5 and which is made up of a rectangular-shaped frame 6 having a cross member 7 at its intermediate portion and diagonally disposed brace members 8 extending from the corners of the frame 6 to connect by welding or other means of method to the intermediate portion of the cross bar 7.

V-shaped frame members 9 extend downwardly from the forward portions of the side members of the frame 6 and have at their front portions barrels 10 for receiving stub shafts 11.

As is clearly shown in Figures 2 and 3, a brace bar 12 extends from the intermediate portion of the bar 7 to connect to the intermediate portion of a forward end bar of the frame 6 and downwardly from the intermediate portion of the bar 12 slope brace bars 13, 13 which are welded or otherwise secured to the stub shaft barrels 10. Each shaft 11 has a head portion thereof threaded as at 14 to accommodate a narrow nut 15. This threaded portion 14 slips through the corresponding barrel 10 with a washer 16 at each end thereof. A spacer sleeve 17 is interposed between the nut 15 and the adjacent washer 16, while a wider nut 18 is provided on the threaded portion 14 and binds against its adjacent washer 16, thus clamping the barrel 10 between the washer 16 and pulling the nut 15 and spacer sleeve 17 against their adjacent washers 16.

A wheel 19 is placed on the remaining end portion of the stub shaft 11 and, of course, a nut 20 may be employed on the threaded portion 21a to prevent displacement of the wheel.

A series of metallic loops or rope or strap guides 21 are provided on the perimeter of the frame 6 so that luggage or other work can be tied on to the frame above described.

The front member of the frame 5 has a depending hook-shaped member 23 (see Figure 7) while the rear end member of the frame carries a depending clamp such as is shown clearly in Figures 3 and 4, as well as in Figure 5. This clamp consists of a U-member 24 welded or otherwise secured as at 25 to the frame 6 and having a pair of bolts 26, 26 welded or otherwise secured thereto and depending from the ends of said clamp member 24. Numeral 27 represents a complementary clamp member having an opening in one end for receiving one of the bolts 26 and an arcuate slot 28 in its other end portion for receiving the other bolt 26. Wing nuts 29 are provided on the bolts 26 for securing the clamp plate 27 in clamped position and in the instance of the present invention, against the elongated pole 30 of a staff such as is shown in Figure 8. With the wing nuts 29 unscrewed, the clamp plate 27 can be swung out into the dotted position in Figure 5, thus permitting the removal of the staff 30. This staff as represented, is of conventional construction, representing the usual type employed by Boy Scouts. This type in addition to the pole 30, the staff includes a socketed head 31 of tapered construction and having a laterally disposed hook 32 thereon. The clamp above described engages the pole at an intermediate portion, while the head 31 projects into the hook 23 while the hook 32 on the head 31 engages over the forward end of the frame 6, as clearly shown in Figures 1 and 9.

If it is desired to employ two of these carts connected together to provide an elongated vehicle for carrying logs and much heavier and/or longer work, two carts of the construction above described may be placed together as shown in Figure 9 and connected by two specially constructed staffs 35, 36. The staff 35 in addition to its head construction 35b has a tubular head portion 37 formed with transverse openings therein, while the staff 36 in addition to its head 36a has a reduced head portion 38 formed with transverse openings 39. A pin 40 can be disposed through predeterminedly matched openings of the reduced portion 38 and the tubular extension 37 to hold the staffs 35, 36 together and to support the carts in the position shown in Figure 9.

As is clearly shown in the drawings each cart has at its forward end an inverted U-shaped guard rail 41 with short brace members 42 therefor.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A cart of the character described comprising a frame, wheels for the frame, one end of the frame provided with a member having an opening therein, the other end of the frame provided with a clamp, an elongated staff disposed partly under the frame and having one end reduced and disposed into the open member and another portion thereof embraced by the clamp said clamp consisting of a U-shaped seat member permanently secured on the frame and adapted to embrace said staff and a cap member swingingly mounted on said seat member, and wing nuts for tightening said members around said staff.

2. A cart of the character described comprising a frame, wheels for the frame, one end of the frame provided with a hook, the other end of the frame provided with a clamp, an elongated staff disposed partly under the frame and having one end disposed into the hook and another portion thereof embraced by the clamp, said staff being provided with a hook for engagement over one end of the frame said clamp consisting of a U-shaped seat member permanently secured on the frame and adapted to embrace said staff and a cap member swingingly mounted on said seat member, and wing nuts for tightening said members around said staff.

WARREN F. BRUMFIELD.